Feb. 27, 1951 V. D. LANDON ET AL 2,543,246
SIGNAL DELAY DEVICE
Filed June 21, 1946 9 Sheets-Sheet 2
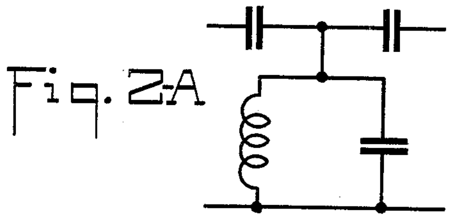
Fig. 2-A
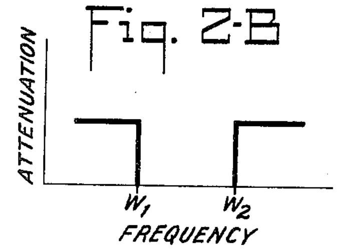
Fig. 2-B
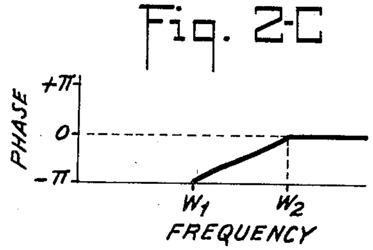
Fig. 2-C
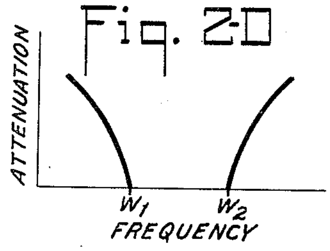
Fig. 2-D
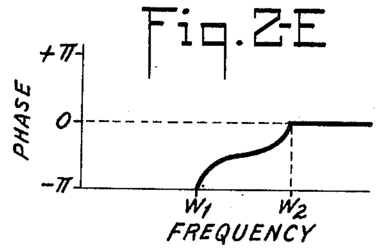
Fig. 2-E
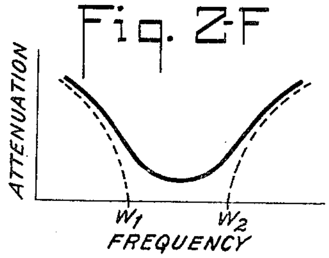
Fig. 2-F
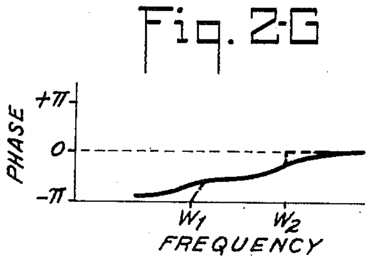
Fig. 2-G
INVENTORS.
VERNON D. LANDON
ALBRECHT J. NEUMANN
& LESTER C. SMITH
BY C. D. Tuska
ATTORNEY Feb. 27, 1951 V. D. LANDON ET AL 2,543,246

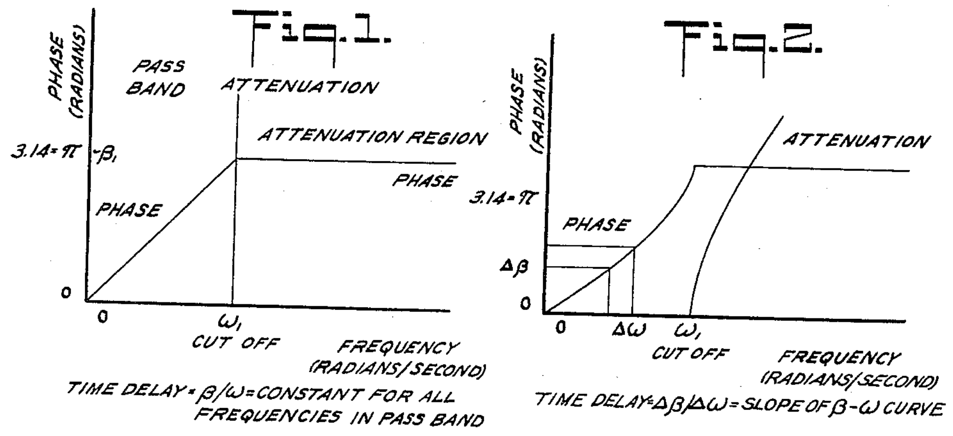
Fig. 1. Fig. 2.
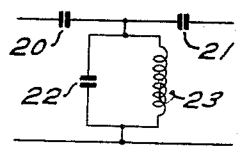
Fig. 3.
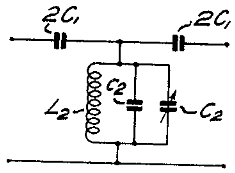
Fig. 6.
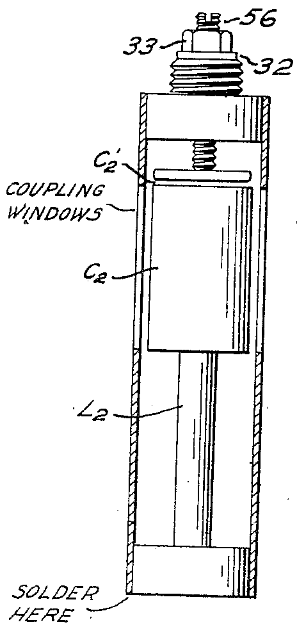
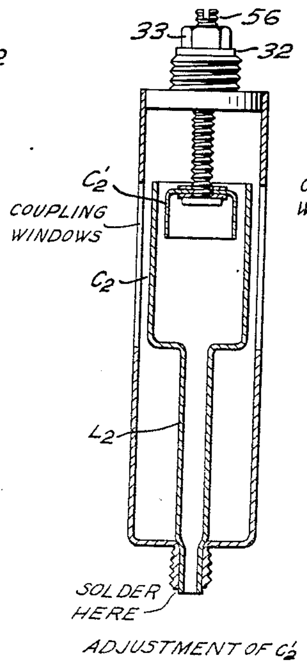
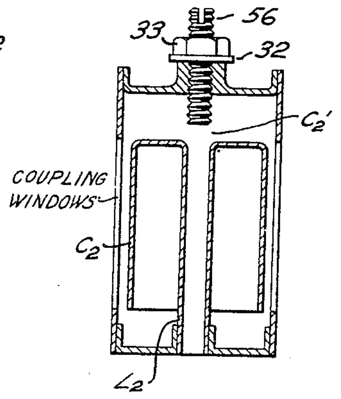
Fig. 7-C.
INVENTORS
VERNON D. LANDON
ALBRECHT J. NEUMANN
& LESTER C. SMITH
BY
C D Tuska
ATTORNEY
Fig. 7-A. Fig. 7-B.

SIGNAL DELAY DEVICE

Filed June 21, 1946 9 Sheets-Sheet 3

INVENTORS
VERNON D. LANDON
ALBRECHT J. NEUMANN
& LESTER C. SMITH
BY
C D Tuska
ATTORNEY

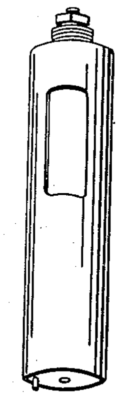
Fig. 8-A.
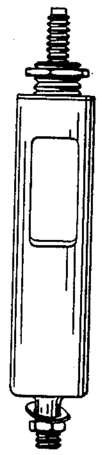
Fig. 8-B.
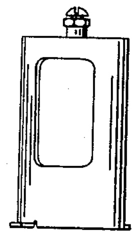
Fig. 8-C.
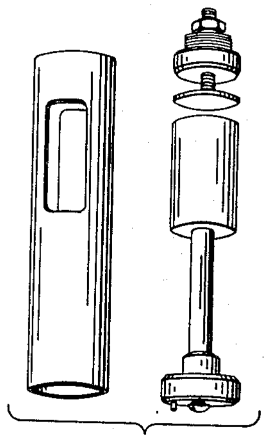
Fig. 9-A.
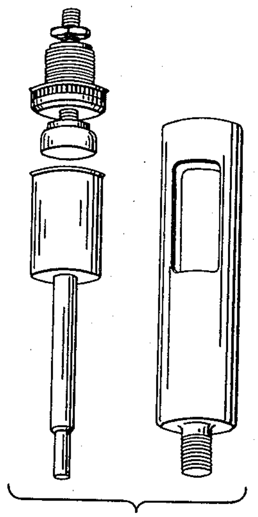
Fig. 9-B.
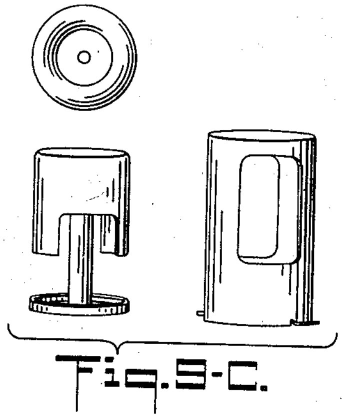
Fig. 9-C.
INVENTORS
VERNON D. LANDON
ALBRECHT J. NEUMANN
& LESTER C. SMITH
BY
C D Tuska
ATTORNEY Feb. 27, 1951 V. D. LANDON ET AL 2,543,246

SIGNAL DELAY DEVICE

Filed June 21, 1946 9 Sheets-Sheet 5

INVENTORS
VERNON D. LANDON
ALBRECHT J. NEUMANN
& LESTER C. SMITH
BY
C. D. Tuska
ATTORNEY INVENTORS
VERNON D. LANDON
ALBRECHT J. NEUMANN
& LESTER C. SMITH
BY
C D Tuska
ATTORNEY

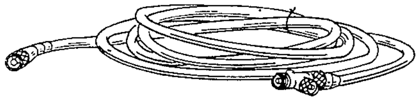
Fig. 12-B.
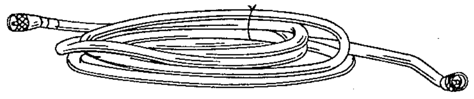
Fig. 12-C.
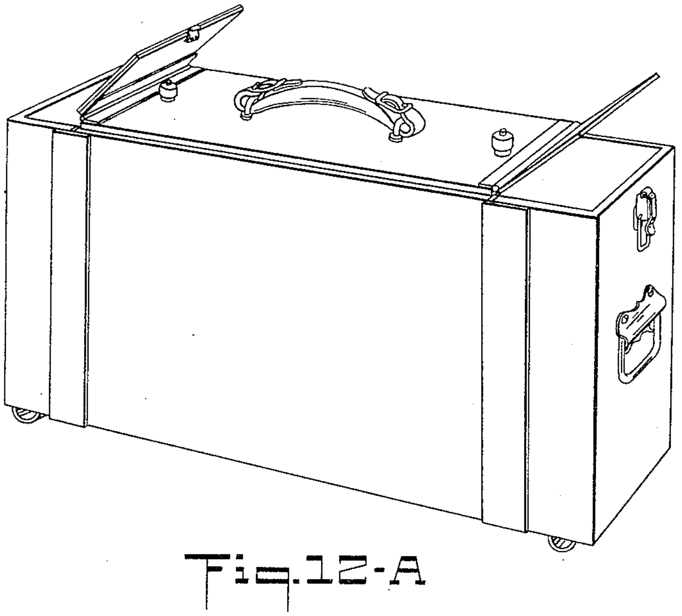
Fig. 12-A
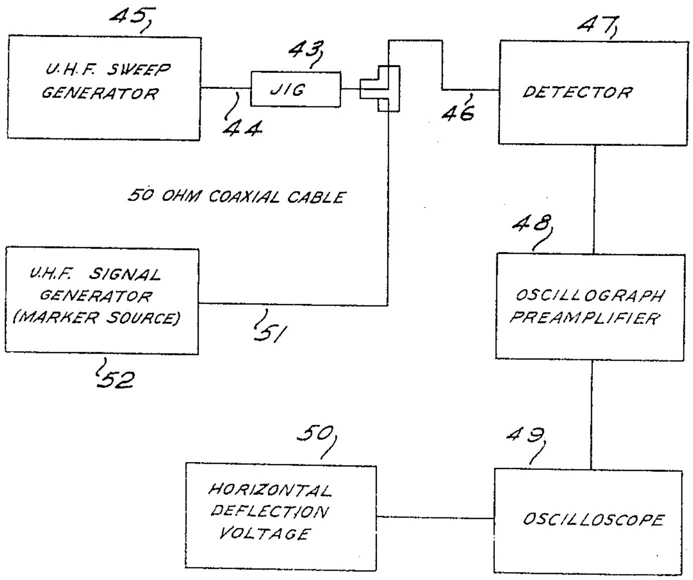
Fig. 13.
INVENTORS
VERNON D. LANDON
ALBRECHT J. NEUMANN
& LESTER C. SMITH
BY
ATTORNEY Feb. 27, 1951
V. D. LANDON ET AL
SIGNAL DELAY DEVICE
2,543,246
Filed June 21, 1946
9 Sheets-Sheet 8
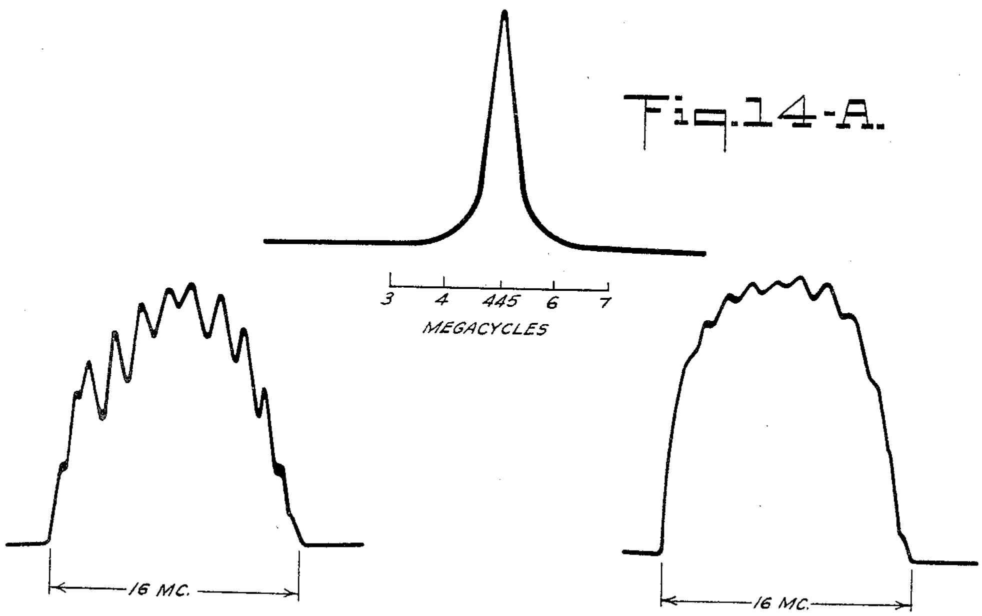
Fig. 14-A. Fig. 14-B. Fig. 14-C.
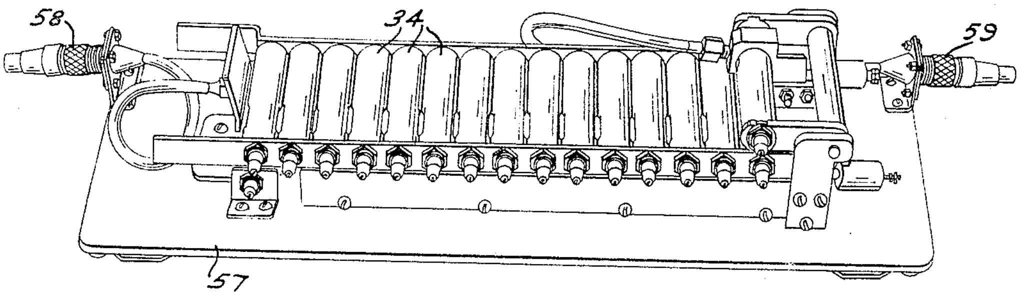
Fig. 16.
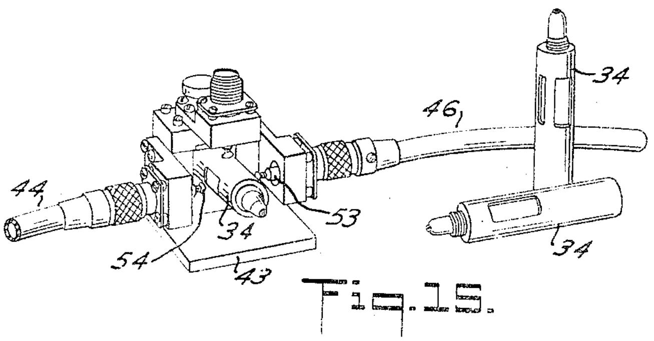
Fig. 15.
INVENTORS
VERNON D. LANDON
ALBRECHT J. NEUMANN
& LESTER C. SMITH
BY
C D Tuska
ATTORNEY Feb. 27, 1951 V. D. LANDON ET AL 2,543,246

SIGNAL DELAY DEVICE

Filed June 21, 1946 9 Sheets-Sheet 9

INVENTORS
VERNON D. LANDON
ALBRECHT J. NEUMANN
& LESTER C. SMITH
BY
C. D. Tuska
ATTORNEY Patented Feb. 27, 1951

2,543,246

UNITED STATES PATENT OFFICE 2,543,246

SIGNAL DELAY DEVICE

Vernon D. Landon and Albrecht J. Neumann, Princeton, and Lester C. Smith, Haddonfield, N. J., assignors to Radio Corporation of America, a corporation of Delaware Application June 21, 1946, Serial No. 678,262

2 Claims. (Cl. 178—44)

This invention relates to signal delay devices such as are useful for delaying a high frequency signal by a predetermined time interval, and has for its principal object the provision of an improved time delay device and method of operation whereby the use of such devices is facilitated from the viewpoint of compactness, portability and freedom from the effect of climatic conditions.

The time delay device of the present invention is illustrated as applied to the calibration of radio reflection altimeters. It is apparent, however, that it is applicable in numerous other situations where it is desired to delay a high frequency signal by a time interval which may be determined by the constants of the device either as fixed in the original construction of the device or as adjusted during its use.

In the calibration of radio reflection altimeters, it is desirable to use an artificial delay device so that the range may be set accurately while the altimeter is on the test bench or is being installed in the aircraft. In a frequency modulation type of altimeter, the altitude indication depends on the time interval between the transmission of the signal and the reception of its reflected component. In the past, coaxial delay cables have been used to provide the time delay by which such altimeters are calibrated. Coaxial cables are well suited for this purpose in the case of low range altimeters with a range of several hundred feet but are not adapted to the calibration of altimeters having a range of several thousand feet.

Important objects of the present invention are the provision of an improved device which is adapted to delay a high frequency signal for a relatively long time interval, the provision of a signal delay device which transmits the signal efficiently and with a minimum of attenuation, the provision of an improved signal delay device which is of the passive network type, and the provision of a signal delay device consisting of a plurality of tuned coaxial line sections so interconnected and interrelated as to form a band pass filter adapted to pass a predetermined frequency spectrum coextensive with the frequency sweep of a high altitude altimeter of the frequency modulation type.

The invention will be better understood from the following description considered in connection with the accompanying drawings and its scope is indicated by the appended claims.

Referring to the drawings:

Figure 1 is an explanatory diagram relating to the characteristics of an idealized or lossless low pass filter, Figure 2 is a similar diagram relating to the characteristics of a typical non-dissipative low pass filter.

Figures 2A to 2G are explanatory diagrams relating to the operation of a band pass filter.

Figures 2B and 2C being idealized curves,

Figures 2D and 2E being curves for a lossless filter, and

Figure 4:
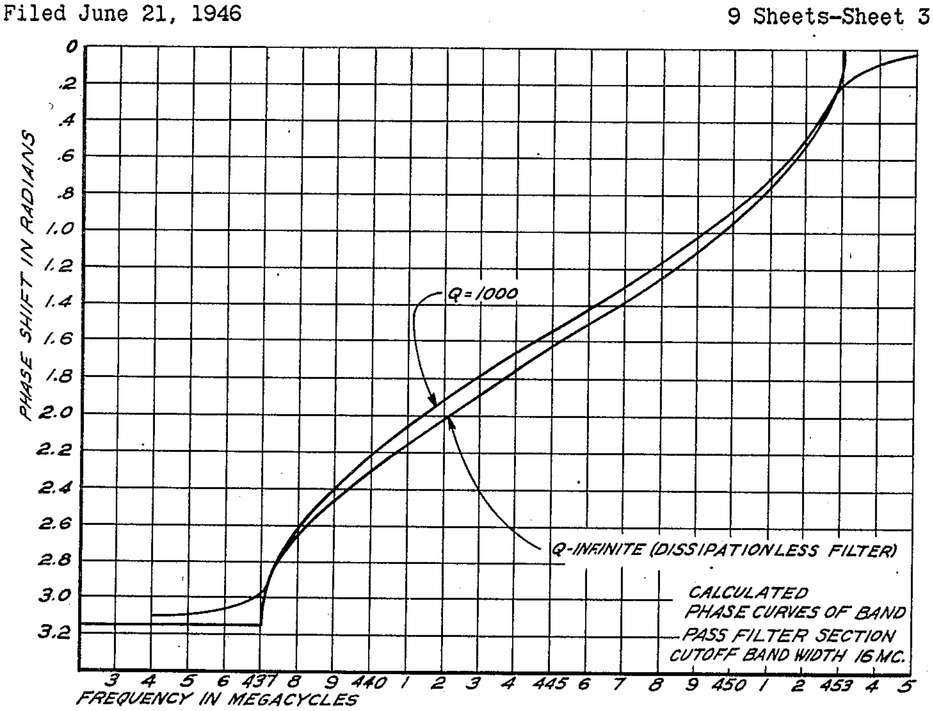
Figure 5:
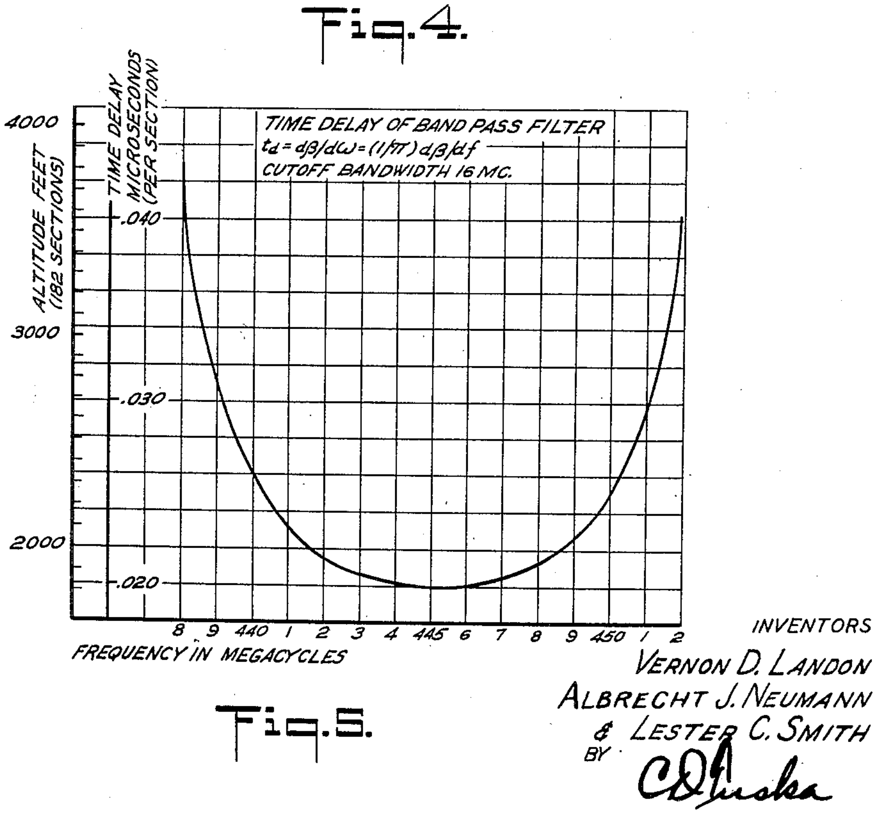

Figures 2F and 2G being actual response curves,

Figure 3 is a wiring diagram of a band pass filter which is the equivalent of one of the tuned coaxial line sections utilized in the delay device of the present invention, Figures 4 and 5 are curves illustrating certain characteristics of the filter elements previously mentioned, Figure 6 is a more detailed wiring diagram of a band pass filter which is equivalent to those forming a part of the improved signal delay device.

Figures 7*a*, 7*b* and 7*c* are sectional views of different filter elements constructed in accordance with the present invention, Figures 8*a* to 8*c* are perspective views of the filter elements of Figures 7*a* to 7*c*.

Figure 10:
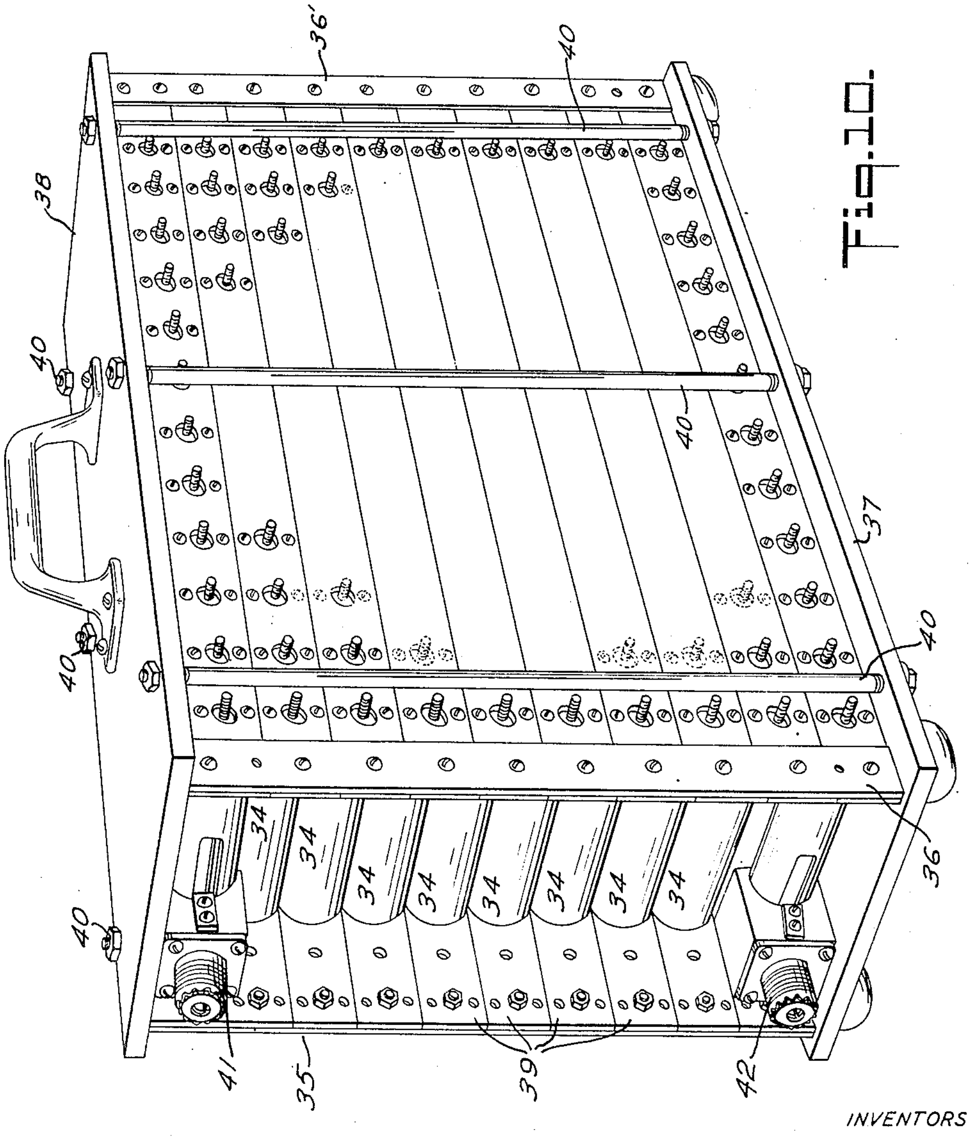
Figure 11:
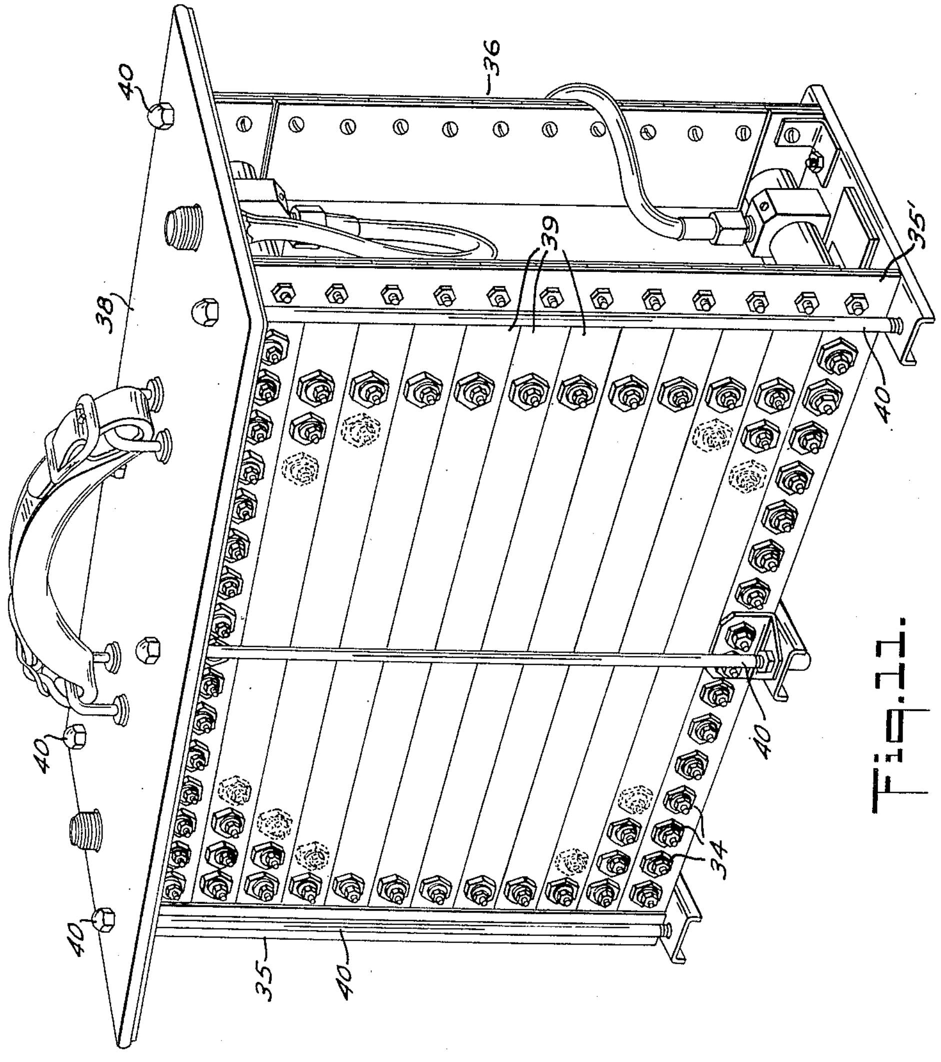
Figure 17:
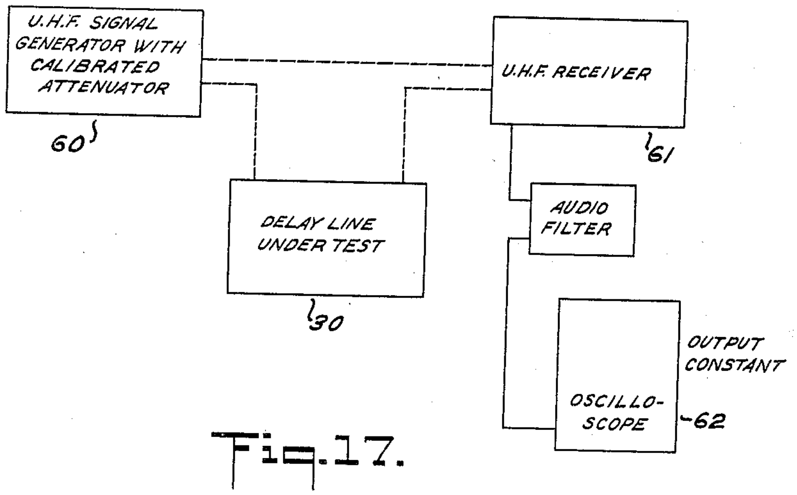
Figure 18:
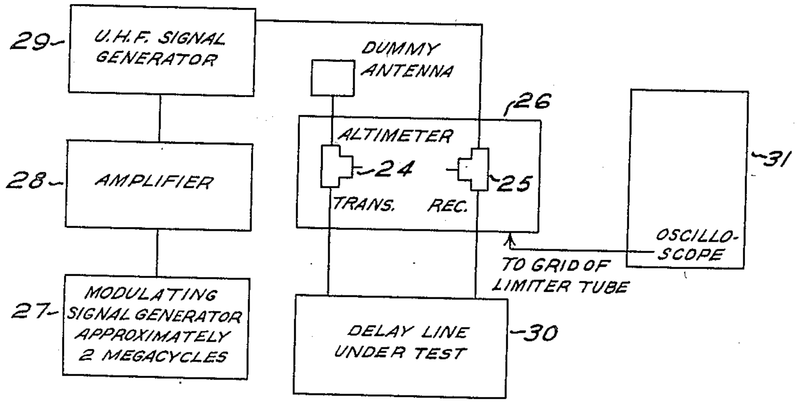
Figure 19:
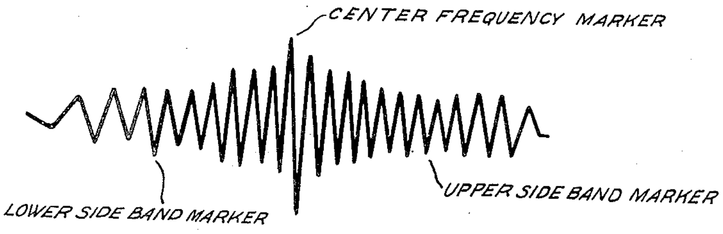

Figures 9*a* to 9*c* show the filter elements of Figures 7*a* to 7*c* in dissembled form, Figure 10 is a perspective view of one type of the improved delay device with its casing removed, Figure 11 is a perspective view of another form of the improved delay device with its casing removed, Figures 12*a*, 12*b* and 12*c* show the delay device of Figure 11 with its casing in place, Figure 13 is a block diagram of an equipment for testing and adjusting the filter elements, Figures 14*a* to 14*c* are explanatory curves relating to the adjustment and testing of the filter elements, Figure 15 is a perspective view of the filter elements and of a number of such elements, Figure 16 illustrates how a strip of such elements are tested and adjusted, Figure 17 is a block diagram of a circuit for measuring the attenuation of the delay device, Figure 18 is a block diagram illustrating how the delay device is utilized to calibrate an altimeter, and Figure 19 is an explanatory diagram relating to the operation of the circuit of Figure 18.

The radio reflection altimeter, for the purpose of illustration, may be assumed to operate with a modulated carrier at 445 megacycles with a deviation of plus or minus two megacycles at a sweep rate of 120 cycles per second. Analysis of the altimeter signal shows that the frequency spectrum does not extend much beyond the sweep width which is about 4 megacycles so that the whole energy of the signal is confined to a relatively narrow band. The problem is to provide a device which will delay this signal for a time interval of the order of four microseconds which corresponds to an equivalent range of 2000 feet.

Time delay may be defined as the reciprocal of the group velocity of the signal times the distance which is the velocity of the propagation of energy. It is known that time delay is equal to $$t_d=\frac{d\beta}{d\omega}\text{ seconds} \qquad (1)$$

which is the slope of the phase shift ($\beta$) vs. frequency ($\omega$) curve, both coordinates of the curve being in radians. For an idealized (losses disregarded) low pass filter with a linear phase curve such as that shown by Figure 1, this is equal to the total phase shift $\beta_1$ divided by the total frequency change or bandwidth $\omega_1$ or $$t_d=\frac{\beta_1}{\omega_1}\text{ seconds} \qquad (2)$$

This idealized filter, of course, cannot be realized.

Figure 2 shows the typical characteristic curves for a non-dissipative filter. From these curves, it is seen that the time delay $t_d$ or the slope of the phase curve is not constant over the band but may be regarded as constant over small increments of the frequency $\Delta\omega$ over which the phase curve may be taken as linear. Thus for the frequency group $\Delta\omega$, the time delay is $$t_d=\frac{\Delta\beta}{\Delta\omega} \qquad (3)$$

The same holds for a band pass filter. This is indicated by Figure 2A to 2C, Figure 2A showing the connections of a band pass filter, Figure 2B being the idealized attenuation versus frequency curve of such a filter, and Figure 2C being the idealized phase versus frequency curve. Corresponding curves for a lossless filter are shown in Figures 2D and 2E and the actual response curves are shown in Figures 2F and 2G. In the impractical idealized filter, the time delay is constant throughout the band since the slope of the phase curve is constant. On this basis, assuming a band of 16 cycles per microsecond or 100 radians per microsecond, and a total phase shift per section of $\pi$ radians, the time delay per section according to Equation 2 is $$t_d=\frac{\beta}{\omega}=\frac{\pi}{100}=.0314\text{ microsecond} \qquad (2a)$$

To realize a time delay of $T_d$ microseconds, $n$ sections are needed where:

$$n=\frac{T_d}{t_d} \qquad (4)$$

If $T_d=4$ microseconds, $n=128$ sections. This is a considerably smaller number of sections than can be achieved with a low pass filter.

The time retarding action of the filter depends directly on its band pass characteristics. The band pass filter section shown in Figure 3 is the design basis for the signal delay device of the present invention. The behavior of this section is typical of many other types of band pass filters, and appropriate conclusions and analogies are readily derived from it. It includes a pair of series capacitors 20 and 21 and a shunt capacitor 22 which is connected in shunt to a coil 23.

As indicated by the curves of Figure 2*a*, the idealized filter has a linear phase curve through the pass band i. e. the phase shift is proportional to the frequency. The attenuation in the band pass is zero and rises rapidly to a large value at both cutoff points. A filter with very small losses (one with high Q circuit elements) has characteristics which closely resemble these of the lossless or dissipationless filter in which all circuit resistances are neglected (see Figure 2*b*). In this case, the attenuation is zero within the pass band and rises from zero at cutoff to high values on either side of cutoff. The phase is no longer linear but has a varying slope throughout the pass band and infinite slope at both cutoff points. The phase shift below the lower cutoff frequency $f_1$ is $-\pi$ and is zero beyond the upper cutoff frequency $f_2$.

As indicated by Figure 5, the calculated delay curve has a minimum near the center frequency of the band pass and rises to very high values near the cutoff frequencies.

The presence of losses in the filter causes the corners of the phase curve to round off and introduces small losses in the pass range. For relatively narrow filters, the minimum attenuation is inversely proportional to the band width and the only other factor influencing the attenuation is the Q of the components of the filter. The values of the attenuation of several filters in cascade are added to obtain the overall attenuation of the system when all units are expressed in logarithmic units and when the filters are terminated on an image basis. The total phase shift of a number of equal filter sections in cascade is equal to the sum of the phase shifts of the individual sections.

The altitude A as read on an altimeter indicator is directly proportional to the time delay of the filter according to $$2A=t_d\times C\text{ feet} \qquad (5)$$

where 2A is the actual distance travelled by the signal in feet and C is the velocity of a radio wave in air in feet per microseconds.

Since in any practical case the slope of the phase curve is a function of frequency, the indicated altitude will also be a function of frequency unless steps are taken to compensate the phase curve. Phase compensation is well known at low but is not known at ultra high frequency insofar as applicants are informed.

The delay device works between 50 ohm terminations at the transmitter 24 and receiver 25 (Figure 18) of the altimeter equipment 26. A frequency modulated signal derived through a modulating signal generator 27, an amplifier 28 and an ultra high frequency generator 29 is applied to the receiving antenna 25 and through the delay device 30 to the transmitting antenna 24. A potential derived from the grid of the limiter tube of the altimeter produces on the screen of an oscilloscope 31 a curve of the type shown by Figure 19. It is desirable that the delay device match the 50 ohm terminations at the two antenna of the altimeter.

Figure 6 illustrates the approximate lumped circuit of one of the filter sections and is like Figure 3 with the exception that a trimmer capacitor has been added and that it has applied to it reference characters the same as those used to indicate corresponding parts of the sectional views of the different types of filter units shown in Figures 7*a*, 7*b* and 7*c*.

The characteristic impedance of this filter section is directly proportional to the capacitances $C_1$ through which the adjacent sections are coupled together and the capacitance $C_2$ which is shunted by the inductance $L_2$ and the trimmer capacitance $C_2'$. The characteristic impedance is chosen so that the desired ratio of L2 and C2 is conveniently realized and step up or step down transformers are used at the ends of the filter to match the 50 ohm terminations. Neither the mid shunt nor the mid series impedances are constant over the pass band. A mid shunt termination is to be preferred because of the symmetry of the impedance curve. Near the center frequency of the pass band, the slope of the phase curve for the dissipationless filter is very nearly equal to the slope of the filter with small losses (high Q elements). The time delay, therefore, may be calculated from the theoretical cutoff values according to the formula $$\frac{d\beta}{d\omega}=t_d=\frac{f_1}{\pi f_2}\,\frac{1}{\sqrt{f^2-f_1^2}}\left[\frac{f}{\sqrt{f_2^2-f^2}}+\frac{\sqrt{f_2^2-f^2}}{f}\right] \qquad (6)$$

When $f_2-f_1 \angle \angle f_m$, the center frequency $f_m=\sqrt{f_1 f_2}$.

At the frequencies under consideration, the circuit parameters become small and are difficult to realize physically. For this reason, short sections of coaxial transmission lines are used instead of the conventional capacitors and inductors. The mathematical relation between lumped circuit elements and short coaxial line elements is known.

In order that a multisection filter with several hundred sections may be constructed, it is necessary that the individual filter sections be easy to manufacture and require a minimum of adjustment. The precision of manufacturing must be sufficiently accurate to maintain the necessary tolerances. Of all the band pass filter sections, therefore, those with the least number of parts are to be preferred.

A shorted coaxial line which is shorter than a quarter wave length has an inductive input impedance. By adding a capacitor at the open end, a parallel resonant circuit is formed which is used as the shunt arm of the filter. By adding capacity coupling at a suitable point between the tuned circuits, a band pass filter is obtained which is similar in action to the equivalent circuit of Figure 6.

Figures 7*a*, 7*b* and 7*c* show three different types of these filter sections or tuned elements. Each tuned element includes a short coaxial inductor L2, a variable capacitor $C_2'$ which permits tuning of the section, and a fixed capacitor $C_2$ which is directly connected to the inductor L2. Openings in the sides of the tuned elements or sections provides for the coupling capacity $C_1$ between adjacent filter sections.

These coupling windows are spaced either 180 degrees or 90 degrees apart according to the position of the tuned element in the filter assembly. The trimmer plate is locked by means of a lockwasher 32 and a hex nut 33 which prevents detuning after the frequency has been initially adjusted. The type of section shown in Figure 7*a* is heavier and somewhat more difficult to construct than that of Figure 7*b*. The type of section shown in Figure 7*c* has the advantage of compactness, light weight and simplicity of construction.

Figures 8*c*, 8*d* and 8*e* are perspective views of the sections of Figures 7*a*, 7*b* and 7*c* and Figures 9*a* to 9*c* show these elements in disassembled form.

The complete delay device is formed by a number of filter sections connected in cascade as indicated by Figure 10 which is a perspective view of the device as constructed with sections similar to that of Figure 7*a* and Figure 11 which is a perspective view of the device as constructed with sections similar to that of Figure 7*b*. The number of filter sections is determined by the delay required, the band width of the filter, and the permissible overall attenuation. The band width is determined by the frequency spectrum, and the minimum time delay per section is determined by the formula.

$$t_d=\frac{d\beta}{d\omega}=\frac{1}{\pi}\times\frac{1}{f_2-f_1}\text{ microseconds} \qquad (7)$$

As indicated by Figures 10 and 11, the tuned elements 34 are supported between end brackets 35—36 and 35'—36' which are fixed between a base 37 and a cover 38. Extending between the end brackets 35—36 and 35'—36' and supported by these brackets are strips 39 between which the tuned elements 34 are supported. Extending between the base 37 and the cover 38 are bolts or rods 40. Coupling of the delay device into the circuit in which it is to be used is made through terminals 41 and 42. Figure 12*a* shows the device of Figure 11 with the casing in place and Figures 12*b* and 12*c* show the type of connector by which the device is connected into an external circuit.

The number and arrangement of the tuned elements 34 is determined by considerations of mechanical design and convenience. The strips 39 are stacked vertically and are separated by metallic shields which prevents coupling between the strips. The whole assembly is held in place by the tie rods 40 and is easily removed from the case. At the ends of the case, storage compartments are provided for cables, instruction books, etc. The total weight of the complete device of Figure 11 is about 48 pounds. The device of Figure 11 is of more rugged design than that of Figure 10, has provision for internal shock mounting of the tuned element assembly and has a greater bandwidth for the reason that includes more tuned elements. The signal applied to the input of the device follows a continuous path through all the coupling apertures of the tuned elements to the output.

For the greatest facility in its use, the delay device must withstand rough handling in the field and during transportation. A casing of metal such as aluminum is preferred to a wooden case for use in tropical climates because of its greater resistance to insects and fungus growth.

The weight of the equipment is a direct function of the number of tuned elements in the assembly and the weight of the individual element. The weight of the tuned elements 34 of Figure 11 is 1.7 ounces. These elements are made of brass. A tuned element of the type shown in Figures 7*c*, 8*c* and 9*c* weighs considerably less. By the use of elements made of a metal other than brass, it is possible to reduce the weight still further.

The material of the tuned elements of 7*a*, 8*a* and 9*a* is brass, most of the parts are turned, and the inside plunger consists of five parts which are silver soldered together. This is time consuming and expensive. The tuned elements of 7b, 8b and 9b has the advantage that it includes two drawn brass shells which fit inside one another and are soft soldered at the bottom. Thus two parts take the place of five parts in the tuned element of Figures 7a, 8a and 9a.

A heavy silver plate of not less than one-half mil is applied to all electrical parts so that electrical conduction takes place entirely in the silver. In the type of element of Figures 7a, 8a and 9a, the trimmer spacing at the correct frequency is rather close which makes the tuning characteristic critical. In the type of element of Figures 7b, 8b and 9b, the flat trimmer is replaced by a cup type capacitor which improves the tuning characteristics and affords increased vibrational stability for the reason that the inside parts are much lighter.

The electrical stability of the delay device depends upon the temperature coefficient of the material of the tuned elements and upon certain features inherent in the mechanical design. The frequency of the brass tuned element changes by .8 megacycles for a temperature change of 100 degrees centigrade. Steel has a smaller temperature coefficient but is more difficult to manipulate. The electrical performance depends on the quality of the silver plating and, to some extent on the quality of the soldering. Since the delay produced by the device is inversely proportional to the band width and this width is directly proportional to the coefficient of coupling between the groups of tuned elements, the mechanical assembly directly influences the electrical behavior of the device. This makes necessary precision in the manufacture and assembly of the device.

To this end, the individual tuned elements are aligned in a jig 43 (Figures 13 and 15) which provides loose capacity coupling to the openings in the sides of the elements. One lead 44 of the jig 43 is connected to an ultra high frequency sweep generator 45 which provides signal which sweeps over the tuning range of the element 34. The other lead 46 is connected through a detector 47 and an amplifier 48 to the vertical deflectors of an oscilloscope 49 which has its horizontal deflectors connected to a source 50. When the tuned element in the jig is tuned to a frequency within the range of the sweep generator 45, a resonance curve like that of Figure 14a appears on the screen of the oscilloscope. A variable marker is introduced at the output side of the jig by means of an ultra high frequency generator 52 through a lead 51. The generator 52 is advantageously replaced by a crystal controlled marker source which provides a precision signal for the alignment. A slight adjustment of the trimmer capacitor of the tuned element causes the resonance peak to shift horizontally across the oscilloscope screen. Figure 15 also shows two forms of the tuned element, one a corner section with the openings at 90 degrees and the other a standard section with the openings at 180 degrees.

The coupling of the jig 43 may be varied by turning two small flat headed screws 53 and 54 (Figure 15) which serve as capacitor plates. This coupling is set permanently for the minimum coupling consistent with good reproduction on the oscilloscope screen. The frequency of the center of the pass band depends on the tuning of the individual tuned elements and this depends on the adjustment of the jig. It was found that the proper position of the pass band for the tuned element of Figures 7a, 8a and 9a was obtained when the individual elements were tuned approximately 1.5 megacycles above the desired center frequency.

The transmission quality (Q factor) of the tuned element is judged by the peak height of the resonance curve of Figure 14a. A production standard is adopted and elements which fall below this standard are rejected. It has been noted that tightness of the adjustable trimmer screw 56 (Figures 7a, 7b and 7c) is important. Tightening of the lock nut 33 may increase the height of the resonance curve by several percent. The tuned elements are tuned and locked by a combination socket wrench and screw driver. After final adjustment, a heavy cement is applied to insure against mechanical disturbance of the adjustment.

As illustrated by Figure 16, the assembled strips or groups of tuned elements may be tested in a strip alignment jig 57 which provides terminations 58 and 59 for fifteen tuned elements 34 connected in cascade. This test set up is similar to that for testing the individual tuned elements. Typical response curves are shown in Figure 14b before alignment and in Figure 14c after the strip has been aligned slightly. It is found that the response curves vary considerably. By slightly adjusting the trimmer screw, there is obtained an improvement in overall response which is noted as an increase in the height of the response curve and suppression of irregular peaks and ripples. With increase in the precision of manufacturing and improvement in the mechanical design, it has been found unnecessary to test the elements in strips or groups, the test of the individual elements meeting all the requirements.

The attenuation of the delay device is measured by an insertion method at several frequencies through the pass band. A block diagram of the test layout is shown in Figure 17. A signal which is amplitude modulated at 400 cycles is transmitted from a generator 60 directly to a receiver 61 and then the delay device 30 is connected between the generator and receiver. The calibrated attenuator of the generator 60 is in each case adjusted until the oscilloscope 62 indicates constant output. The difference between the attenuator readings on the generator 60 gives the insertion loss of the delay device. The minimum insertion loss at the center of the pass band is about 38 decibels.

The altitude is measured by determination of the average slope of the phase curve over a frequency band of approximately four megacycles. As indicated by the block diagram of Figure 18 previously mentioned, an ultra high frequency carrier with a variable amplitude modulation of about two megacycles is applied to the receiver 25. The beat frequency signal on the grid of the limiter tube of the altimeter is observed on the screen of the oscilloscope 31. The carrier marker and the side band markers spaced about two megacycles above and below the carrier frequency are shown in Figure 19 as they appear on the oscilloscope screen. The peaks and valleys in this pattern indicate when the signal through the delay device is in phase (peak) and out of phase (valley) with the transmitter signal. The distance between two peaks corresponds to a phase shift of $2\pi$. By counting the number of peaks, the total phase shift between the two points is determined. At the same time, frequency is indicated by the modulation markers and the phase shift for a certain frequency interval may be accurately determined by a careful adjustment of the modulating signal generator until the two side band markers coincide exactly with the two peaks of the pattern. For example, if the total number of peaks between the two markers is 15 and the peaks are exactly aligned with the side band markers when the modulation frequency is 2.05 megacycles, then the time delay is $$t_d=\frac{\Delta\beta}{\Delta\omega}=\frac{15\times2\pi}{2\times2\pi\times2.05}\times2\times2\pi=3.65 \text{ microseconds}$$

and the corresponding altitude is $$A=3.65\times\frac{985}{2}=1800 \text{ feet}$$

This equivalent altitude is determined for several transmitter center frequencies within the specified pass band.

Since the illustrated modification of the delay device is designed for the calibration of a frequency modulation altimeter with a frequency spectrum width of four megacycles, the above method of calibration simulates the actual operating conditions. The accuracy of this method depends mainly on the accuracy of the modulation signal generator which is usually better than one per cent. In practice, the method is found to be accurate and easy to use.

We claim as our invention:

1. A tuned element including an outer conductor having a conductive closure at one of its ends, an inner conductor having one of its ends fixed to said closure and extending within said outer conductor to provide inductive impedance, a hollow conductor fixed to the other end of said inner conductor and extending within said outer conductor to provide capacitative impedance in shunt with said inductive impedance, a cup-shaped member mounted at the other end of said outer conductor and arranged to extend within said hollow conductor to provide additional capacitative impedance in shunt to said inductive impedance, means for adjusting the position of said cup-shaped member within said hollow member, and means for locking said cup-shaped member in said adjusted position.

2. A tuned element including an outer conductor having a conductive closure at one of its ends and having at different points on its periphery openings through which said tuned element may be coupled to a pair of similar tuned elements, an inner conductor having one of its ends fixed to said closure and extending within said outer conductor to provide inductive impedance, a hollow conductor fixed to the other end of said inner conductor and extending within said outer conductor to provide capacitative impedance in shunt with said inductive impedance, a cup-shaped member mounted at the other end of said outer conductor and arranged to extend within said hollow conductor to provide additional capacitative impedance in shunt to said inductive impedance, and means for adjusting the position of said cup-shaped member within said hollow member.

VERNON D. LANDON.
ALBRECHT J. NEUMANN.
LESTER C. SMITH.

REFERENCES CITED

The following references are of record in the file of this patent:

UNITED STATES PATENTS

| Number | Name | Date |
|---|---|---|
| 1,950,237 | Gebhard et al. | Mar. 6, 1934 |
| 2,196,272 | Peterson | Apr. 9, 1940 |
| 2,201,199 | Peterson | May 21, 1940 |
| 2,201,326 | Trevor | May 21, 1940 |
| 2,239,905 | Trevor | Apr. 29, 1941 |
| 2,428,272 | Evans | Sept. 30, 1947 |